(12) United States Patent
Honda et al.

(10) Patent No.: US 11,664,525 B2
(45) Date of Patent: May 30, 2023

(54) METHOD FOR MANUFACTURING ENERGY STORAGE DEVICE AND ENERGY STORAGE DEVICE

(71) Applicant: GS Yuasa International Ltd., Kyoto (JP)

(72) Inventors: Yoshiyuki Honda, Kyoto (JP); Akio Kawai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 18 days.

(21) Appl. No.: 17/307,070

(22) Filed: May 4, 2021

(65) Prior Publication Data

US 2021/0351430 A1 Nov. 11, 2021

(30) Foreign Application Priority Data

May 8, 2020 (JP) .............................. JP2020-082650

(51) Int. Cl.
*H01M 50/103* (2021.01)
*H01M 10/04* (2006.01)

(52) U.S. Cl.
CPC ..... *H01M 10/0431* (2013.01); *H01M 50/103* (2021.01)

(58) Field of Classification Search
CPC ................ H01M 10/0431; H01M 50/103
See application file for complete search history.

(56) References Cited

FOREIGN PATENT DOCUMENTS

| JP | 2009-170137 A | 7/2009 |
| JP | 2013-164903 A | 8/2013 |
| JP | 2016-100046 A | 5/2016 |
| JP | 2017-103164 A | 6/2017 |
| JP | 2018-107021 A | 7/2018 |
| JP | 2018-181435 A | 11/2018 |
| JP | 2020-4644 A | 1/2020 |
| WO | 2018/131417 A1 | 7/2018 |

*Primary Examiner* — Jane J Rhee
(74) *Attorney, Agent, or Firm* — Rankin, Hill & Clark LLP

(57) ABSTRACT

A method for manufacturing an energy storage device according to one aspect of the present invention includes inserting an electrode assembly into a case while causing an insulating member having a sheet-like shape to follow a surface of the electrode assembly in which electrodes are layered. The insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion.

11 Claims, 12 Drawing Sheets

METHOD FOR MANUFACTURING ENERGY STORAGE DEVICE AND ENERGY STORAGE DEVICE

CROSS-REFERENCE TO RELATED APPLICATIONS

This application claims the benefit of Japanese patent application No. 2020-082650, filed on May 8, 2020, which is incorporated by reference.

FIELD

The present invention relates to a method for manufacturing an energy storage device including an insulating member disposed between an electrode assembly and a case, and an energy storage device.

BACKGROUND

Conventionally, a prismatic nonaqueous electrolyte secondary battery has been known (see JP 2009-170137 A). In this rectangular nonaqueous electrolyte secondary battery, a flat wound electrode assembly is covered with an insulating resin sheet, then accommodated in a prismatic battery exterior case, and the battery exterior case is sealed with a sealing plate.

Specifically, in the prismatic nonaqueous electrolyte secondary battery, as shown in FIG. 13, the insulating resin sheet includes a front surface portion 101 and a back surface portion 103 having sizes corresponding to a front surface and a back surface of a flat wound electrode assembly 110, a bottom portion 102 and two pairs of side width portions 104 having sizes corresponding to the thickness of the flat wound electrode assembly 110, two pairs of folded portions 105, and a pair of small tongue-like folded sides 106 extending from the bottom portion 102.

In a state where the insulating resin sheet 100 is spread in a planar shape, as also shown in FIG. 14, the front surface portion 101, the bottom portion 102, and the back surface portion 103 are continuous so as to be sequentially arranged in one direction (first direction: left-right direction in FIG. 14). The side width portion 104 and the folded portion 105 sequentially extend in the second direction from one end of each of the front surface portion 101 and the back surface portion 103 in the second direction (up-down direction in FIG. 14) orthogonal to the first direction, and the side width portion 104 and the folded portion 105 sequentially extend in the second direction also from the other end in the second direction. Further, the folded sides 106 extend in the second direction from both ends of the bottom portion 102 in the second direction.

When the prismatic nonaqueous electrolyte secondary battery is manufactured, the insulating resin sheet 100 is bent, the flat wound electrode assembly 110 is inserted into the space formed by the bent insulating resin sheet 100, and the wound electrode assembly 110 covered with the insulating resin sheet 100 is inserted into the battery outer case. At this time, in the insulating resin sheet 100, each of the side width portions 104 is bent so as to be bent (that is, form a crease) with respect to the adjacent front surface portion 101 or back surface portion 103, and each of the folded portions 105 is bent so as to be bent with respect to the adjacent side width portion 104.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

As described in the related art, in the insulating resin sheet 100 in a state of covering the wound electrode assembly 110, the insulating resin sheet 100 is bent at each of both corner portions of the wound electrode assembly 110 in the thickness direction (specifically, a corner portion constituted by the front surface portion 101 or the back surface portion 103 and the side width portion 104, and a corner portion constituted by the side width portion 104 and the folded portion 105). Therefore, when the thickness of the wound electrode assembly 110 is smaller than an interval between the front surface portion 101 or the back surface portion 103 and the folded portion 105 due to a manufacturing error or the like, a gap is likely to be formed between the front surface portion 101 or the back surface portion 103 and the wound electrode assembly 110.

When a gap is formed between the wound electrode assembly 110 and the front surface portion 101 or the back surface portion 103 of the insulating resin sheet 100 as described above, in the prismatic nonaqueous electrolyte secondary battery, an interval between plates (that is, a positive electrode plate and a negative electrode plate) constituting the wound electrode assembly 110 is likely to change, and when the interval between the plates changes, battery performance may be deteriorated.

Therefore, an object of the present embodiment is to provide a method for manufacturing an energy storage device in which an interval between electrodes constituting an electrode assembly is less likely to change, and an energy storage device in which the interval is less likely to change.

According to the present embodiment, there is provided a method for manufacturing an energy storage device, the method including inserting an electrode assembly into a case while causing an insulating member having a sheet-like shape to follow a surface of the electrode assembly in which electrodes are layered, in which the insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion, in which the first extending member includes a portion adjacent to the first portion and a distal end portion away from the first portion, in which, in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion, and in which, in the insertion of the electrode assembly into the case, the first portion, the second portion, and the third portion of the insulating member are caused to follow corresponding surfaces of the electrode assembly, the first extending portion is wound around the electrode assembly such that a second end surface which is an end surface of the electrode assembly in a third direction orthogonal to each of the first direction and the second direction and the portion of the first extending portion which is adjacent to the first portion face each other, and the second surface and the distal end portion of the first extending portion face each other sequentially, and the electrode assembly is inserted in a state where the electrode assembly is fastened by the first extending portion.

According to the present embodiment, there is provided an energy storage device including:

an electrode assembly in which electrodes are layered;

a case which accommodates the electrode assembly; and an insulating member having a sheet-like shape and disposed between the electrode assembly and the case, in which the insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion, in which the first extending member includes a portion adjacent to the first portion and a distal end portion away from the first portion, in which, in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion, and in which, in a state where the insulating member follows a surface of the electrode assembly, the first portion, the second portion, and the third portion of the insulating member follow surfaces of the electrode assembly, the first extending portion is wound around the electrode assembly such that a second end surface which is an end surface of the electrode assembly in a third direction orthogonal to each of the first direction and the second direction and the portion of the first extending portion which is adjacent to the first portion face each other, and the second surface and the distal end portion of the first extending portion face each other sequentially, and the electrode assembly is fastened by the first extending portion.

According to another aspect of the present embodiment, there is provided an energy storage device including:

an electrode assembly in which electrodes are layered;

a case which accommodates the electrode assembly; and an insulating member having a sheet-like shape and disposed between the electrode assembly and the case, in which the insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion, in which the first extending portion includes a portion adjacent to the first portion and a distal end portion away from the first portion, in which, in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion, and in which the first extending portion of the insulating member is wound around the electrode assembly so as to have a radius of curvature larger than a radius of curvature of a corner portion of the case in a cross-sectional view of the energy storage device as viewed in the second direction.

According to the present embodiment, it is possible to provide the method for manufacturing the energy storage device in which the interval between the electrodes constituting the electrode assembly is less likely to change, and the energy storage device in which the interval is less likely to change.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
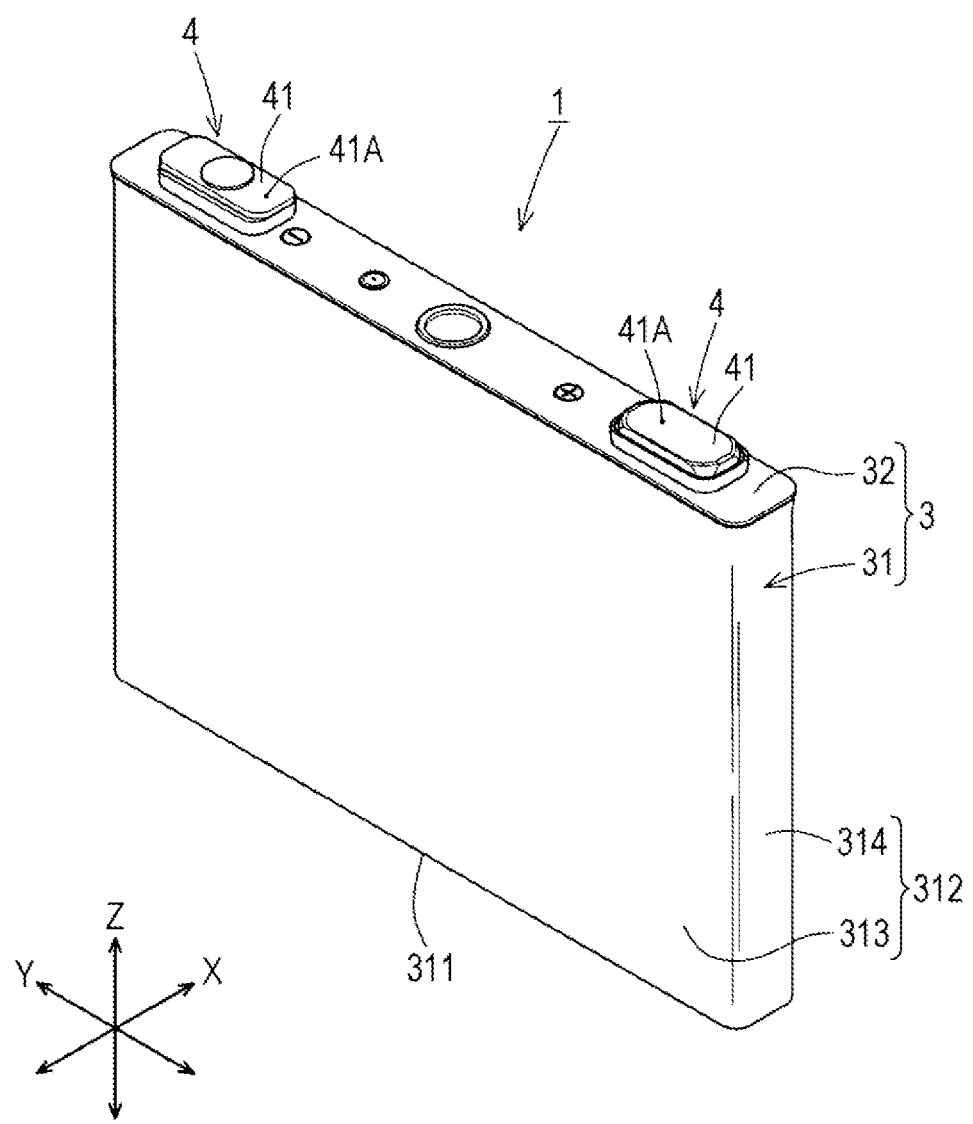
FIG. 1 is a perspective view of an energy storage device according to the present embodiment.

According to the present embodiment, there is provided a method for manufacturing an energy storage device, the method including inserting an electrode assembly into a case while causing an insulating member having a sheet-like shape to follow a surface of the electrode assembly in which electrodes are layered, in which the insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion, in which the first extending portion includes a portion adjacent to the first portion and a distal end portion away from the first portion, in which, in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion, and in which, in the insertion of the electrode assembly into the case, the first portion, the second portion, and the third portion of the insulating member are caused to follow surfaces of the electrode assembly, the first extending portion is wound around the electrode assembly such that a second end surface which is an end surface of the electrode assembly in a third direction orthogonal to each of the first direction and the second direction and the portion of the first extending portion which is adjacent to the first portion face each other, and the second surface and the distal end portion of the first extending portion face each other sequentially, and the electrode assembly is inserted in a state where the electrode assembly is fastened by the first extending portion.

As described above, the electrode assembly is inserted into the case in a state where the electrode assembly is fastened by the first extending portion and hence, in the completed energy storage device, an interval between the electrodes constituting the electrode assembly is less likely to change.

In the method for manufacturing an energy storage device, in the insertion of the electrode assembly into the case, in a state where the insulating member is caused to follow the surface of the electrode assembly, a boundary between the first portion and the first extending portion may be located at a position corresponding to a boundary position between the first surface and the second end surface of the electrode assembly in the third direction, and the portion of the first extending portion which is adjacent to the first portion may be bent toward the second surface of the electrode assembly with respect to the first portion to face the second end surface, and at least a part of a remaining portion of the first extending portion may be curved so that the first extending portion follows the electrode assembly.

According to such a configuration, the insulating member is bent only at one corner portion (corner portion constituted by the first portion and the first extending portion) of both corner portions of the first extending portion wound around the electrode assembly in the thickness direction (first direction) of the electrode assembly, so that the first extending portion can easily follow the electrode assembly when wound around the electrode assembly, whereby the electrode assembly can be sufficiently fastened. As a result, in the electrode assembly of the completed energy storage device, the interval between the electrodes is further less likely to change.

Further, in the method for manufacturing an energy storage device, the insulating member may include a second extending portion extending from an end portion of the first portion opposite to the end portion from which the first extending portion extends, and in the insertion of the electrode assembly into the case, the second extending portion may be wound around the electrode assembly from a portion adjacent to the first portion toward a distal end side so as to face a third end surface which is an end surface opposite to the second end surface of the electrode assembly in the third direction and the second surface in this order, and the electrode assembly may be inserted in a state where the electrode assembly is fastened by the second extending portion.

With such a configuration, the electrode assembly is fastened by the first extending portion and the second extending portion which extend from both ends of the first portion in the third direction and hence, in the electrode assembly of the completed energy storage device, the interval between the electrodes is less liable to change.

Further, in the method for manufacturing an energy storage device, in the insertion of the electrode assembly into the case, in a state where the insulating member is caused to follow the surface of the electrode assembly, a boundary between the first portion and the second extending portion may be located at a position corresponding to a boundary position between the first surface and the third end surface of the electrode assembly in the third direction, and the portion of the second extending portion which is adjacent to the first portion may be bent toward the second surface of the electrode assembly with respect to the first portion to face the third end surface, and at least a part of a remaining portion of the second extending portion may be curved so that the second extending portion follows the electrode assembly.

According to such a configuration, the insulating member is bent only at one corner portion (corner portion constituted by the first portion and the second extending portion) of both corner portions of the second extending portion wound around the electrode assembly in the thickness direction (first direction) of the electrode assembly, so that the second extending portion can easily follow the electrode assembly when wound around the electrode assembly, whereby the electrode assembly can be sufficiently fastened even by the second extending portion. As a result, in the electrode assembly of the completed energy storage device, the interval between the electrodes is further less likely to change.

Further, according to the present embodiment, there is provided an energy storage device including:

an electrode assembly in which electrodes are layered;

a case which accommodates the electrode assembly; and an insulating member having a sheet-like shape and disposed between the electrode assembly and the case, in which the insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion, in which the first extending portion includes a portion adjacent to the first portion and a distal end portion away from the first portion, in which, in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion, and in which, in a state where the insulating member follows a surface of the electrode assembly, the first portion, the second portion, and the third portion of the insulating member follow corresponding surfaces of the electrode assembly, the first extending portion is wound around the electrode assembly such that a second end surface which is an end surface of the electrode assembly in a third direction orthogonal to each of the first direction and the second direction and the portion of the first extending portion which is adjacent to the first portion face each other, and the second surface and the distal end portion of the first extending portion face each other sequentially, and the electrode assembly is fastened by the first extending portion.

According to such a configuration, since the electrode assembly is fastened by the first extending portion, the interval between the electrodes constituting the electrode assembly is less likely to change.

Further, according to the present embodiment, there is provided an energy storage device including:

an electrode assembly in which electrodes are layered;

a case which accommodates the electrode assembly; and an insulating member having a sheet-like shape and disposed between the electrode assembly and the case, in which the insulating member includes a first portion corresponding to a first surface of the electrode assembly in a first direction which is a direction of a short side surface of the case and a thickness direction of the electrode assembly, a second portion corresponding to a first end surface which is an end surface of the electrode assembly in a second direction orthogonal to the first direction, a third portion corresponding to a second surface of the electrode assembly in the first direction, and a first extending portion extending from the first portion, in which the first extending portion includes a portion adjacent to the first portion and a distal end portion away from the first portion, in which, in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion, and in which the first extending portion of the insulating member is wound around the electrode assembly so as to have a radius of curvature larger than a radius of curvature of a corner portion of the case in a cross-sectional view of the energy storage device as viewed in the second direction.

According to such a configuration, since the electrode assembly is fastened by the first extending portion, the interval between the electrodes constituting the electrode assembly is less likely to change.

Further, in the energy storage device according to the present embodiment, the first extending portion of the insulating member may be wound around the electrode assembly such that a gap is formed between the corner portion of the case and the first extending portion in a cross-sectional view of the energy storage device as viewed from the second direction.

According to such a configuration, the first extending portion easily follows the electrode assembly when wound around the electrode assembly, whereby the electrode assembly can be sufficiently fastened by the first extending portion. As a result, in the electrode assembly of the completed energy storage device, the interval between the electrodes is further less likely to change.

Further, in the energy storage device according to the present embodiment, the distal end portion of the first extending portion may be wound around the electrode assembly so as to face the third portion, the insulating member may include a folded portion extending from the third portion, and the first extending portion, the folded portion, and a second end surface which is an end surface of the electrode assembly in the third direction may be arranged in this order in the third direction.

According to such a configuration, the first extending portion easily follows the electrode assembly when wound around the electrode assembly, whereby the electrode assembly can be sufficiently fastened by the first extending portion. As a result, in the electrode assembly of the completed energy storage device, the interval between the electrodes is further less likely to change.

Further, in the energy storage device according to the present embodiment, in a state where the insulating member follows the surface of the electrode assembly, the first portion, the second portion, and the third portion of the insulating member may follow corresponding surfaces of the electrode assembly, the first extending portion may be wound around the electrode assembly such that a second end surface which is an end surface of the electrode assembly in the third direction and a portion of the first extending portion which is adjacent to the first portion face each other, and the second surface and the distal end portion of the first extending portion face each other, and the first extending portion may be curved along the second end surface.

According to such a configuration, the first extending portion easily follows the electrode assembly when wound around the electrode assembly, whereby the electrode assembly can be sufficiently fastened by the first extending portion. As a result, in the electrode assembly of the completed energy storage device, the interval between the electrodes is further less likely to change.

Further, in the energy storage device according to the present embodiment, the energy storage device may further include a current collector disposed on a second end surface which is an end surface of the electrode assembly in the third direction, and the case, the first extending portion, and the current collector may be arranged in this order, and the first extending portion of the insulating member may be wound while facing the second end surface which is the end surface of the electrode assembly.

According to such a configuration, even when the current collector is provided on the second end surface of the electrode assembly, the first extending portion easily follows the electrode assembly when wound around the electrode assembly, whereby the electrode assembly can be sufficiently fastened by the first extending portion. As a result, in the electrode assembly of the completed energy storage device, the interval between the electrodes is further less likely to change.

Further, in the energy storage device according to the present embodiment, in a state where the insulating member follows the surface of the electrode assembly, the first portion, the second portion, and the third portion of the insulating member may follow corresponding surfaces of the electrode assembly, the first extending portion may be wound around the electrode assembly such that a second end surface which is an end surface of the electrode assembly in the third direction and a portion of the first extending portion which is adjacent to the first portion face each other, and the second surface and the distal end portion of the first extending portion face each other, the first extending portion may be curved along the second end surface, and the distal end portion may be pulled toward a center of the second surface of the electrode assembly and fastened.

According to such a configuration, the first extending portion easily follows the electrode assembly when wound around the electrode assembly, whereby the electrode assembly can be sufficiently fastened by the first extending portion. As a result, in the electrode assembly of the completed energy storage device, the interval between the electrodes is further less likely to change.

Further, in the energy storage device according to the present embodiment, the electrode assembly may be a substantially rectangular parallelepiped, the electrode assembly may include:

the first surface;

the first end surface that is a bottom surface in the second direction;

the second surface facing the first surface;

the second end surface;

a third end surface which is an end surface of the electrode assembly opposite to the second end surface in the third direction; and a fourth end surface which is an upper surface in the second direction and is an end surface opposite to the first end surface, and the insulating member may include:

the first portion corresponding to the first surface;

the second portion corresponding to the first end surface;

the third portion corresponding to the second surface;

the first extending portion corresponding to the second end surface; and a second extending portion which corresponds to the third end surface and extends from an end portion of the first portion opposite to the end portion from which the first extending portion extends.

According to such a configuration, the first extending portion easily follows the electrode assembly when wound around the electrode assembly, whereby the electrode assembly can be sufficiently fastened by the first extending portion. As a result, in the electrode assembly of the completed energy storage device, the interval between the electrodes is further less likely to change.

Hereinafter, an embodiment of an energy storage device and a method for manufacturing the energy storage device according to the present invention will be described with reference to FIGS. 1 to 11. Hereinafter, the energy storage device will be first described, and then the method for manufacturing the energy storage device will be described.

Examples of the energy storage device include a primary battery, a secondary battery, and a capacitor. In the present embodiment, a chargeable-dischargeable secondary battery will be described as an example of the energy storage device. The names of the constituent members (constituent elements) of the present embodiment are used in the present embodiment, and may differ from the names of the constituent members (constituent elements) in the background technology.

The energy storage device of the present embodiment is a nonaqueous electrolyte secondary battery. More specifically, the energy storage device is a lithium ion secondary battery that utilize electron transfer caused by movement of lithium ions. This type of energy storage device supplies electric energy. A single or a plurality of energy storage devices are used. Specifically, the energy storage device is used singly when required power and required voltage are small. On the other hand, when at least one of the required power and the required voltage is large, the energy storage device is used in an energy storage apparatus in combination with another energy storage device. In the energy storage apparatus, an energy storage device used in the energy storage apparatus supplies electric energy.

Figure 2:
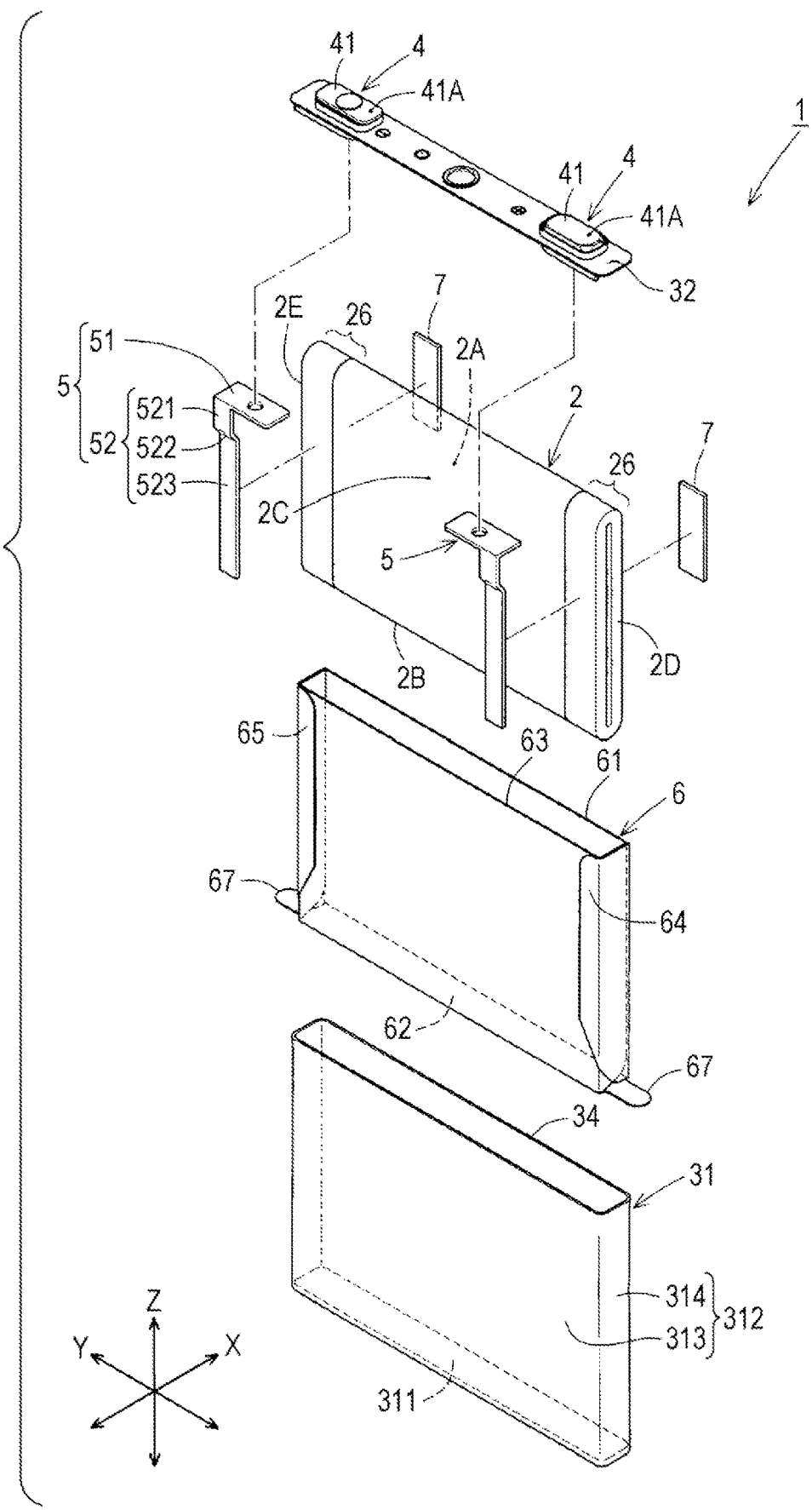
FIG. 2 is an exploded perspective view of the energy storage device.
Figure 3:
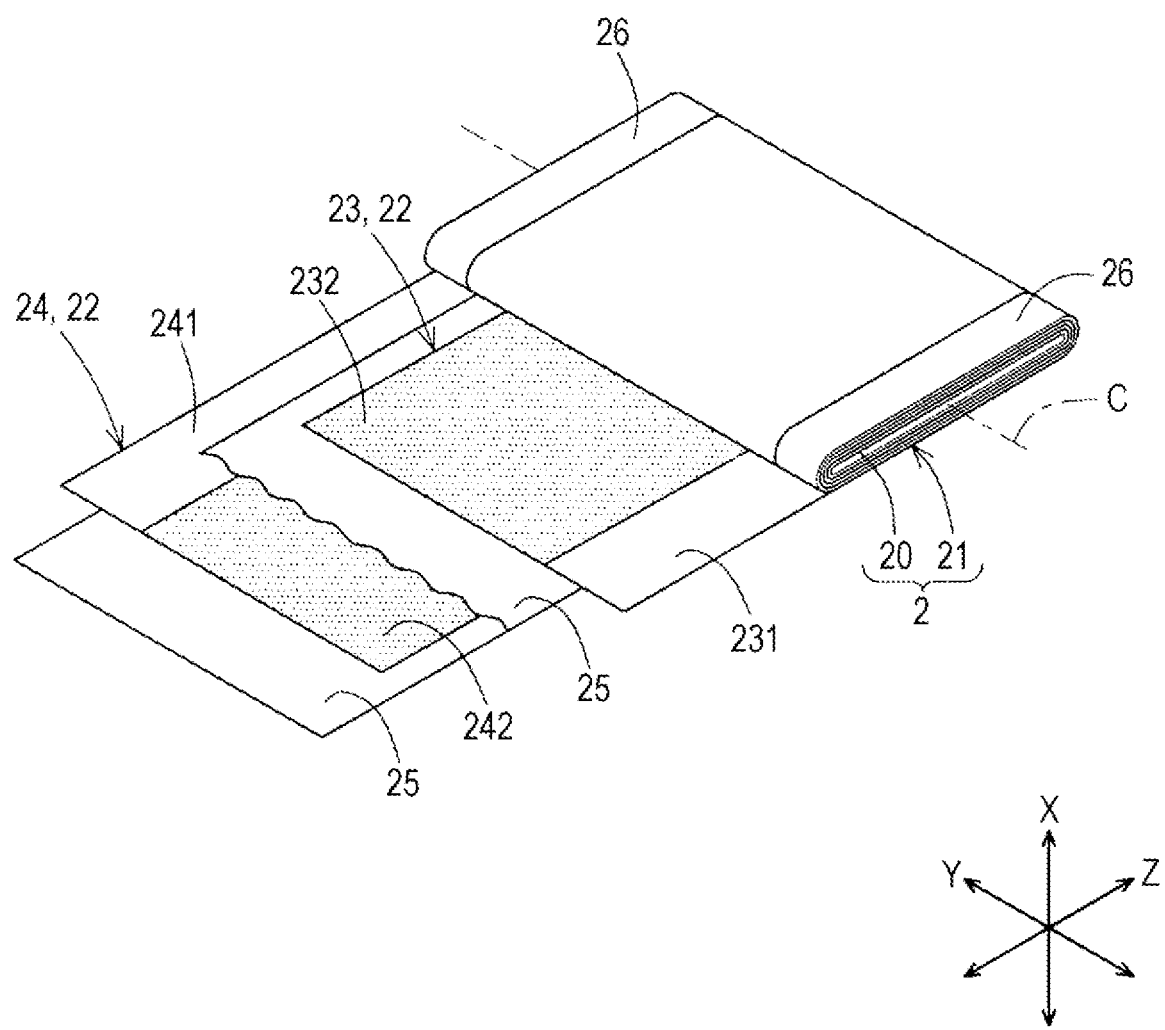
FIG. 3 is a view for explaining a configuration of an electrode assembly provided in the energy storage device.

As shown in FIG. 1 to FIG. 3, the energy storage device includes: an electrode assembly 2 in which electrodes 22 are layered and which is flat; a case 3 which accommodates the electrode assembly 2; and an insulating member 6 which is disposed between the electrode assembly 2 and the case 3 in a state where the insulating member 6 follows a surface of the electrode assembly 2. The energy storage device 1 further includes: external terminals 4 which are each attached to the case 3 in a state where at least a part of the external terminal 4 is exposed or are each formed of at least a portion of the case 3; current collectors 5 which connect the electrode assembly 2 and the external terminals 4 to each other; and plate-like members 7 which sandwich the electrode assembly 2 together with the current collectors 5. The external terminals 4 of the present embodiment are attached to the case 3.

The electrode assembly 2 is a so-called winding-type electrode assembly in which the electrodes 22 are wound in a flat shape. To be more specific, the electrode assembly 2 includes a winding core 20, and a layered product 21 formed of the electrodes 22 and a separator 25 wound around the winding core 20. The electrodes 22 of the present embodiment include a positive electrode 23 and a negative electrode 24. Hereinafter, a thickness direction (first direction) of the electrode assembly 2 is defined as an X axis direction of an orthogonal coordinate system, a direction (third direction) in which a winding axis C of the electrode assembly 2 extends is defined as a Y axis direction of the orthogonal coordinate system, and a direction (second direction) orthogonal to each of the X axis direction and the Y axis direction is defined as a Z axis direction of the orthogonal coordinate system.

In the layered product 21, the positive electrode 23 and the negative electrode 24 are layered in a state of being insulated from each other. In the electrode assembly 2, lithium ions move between the positive electrode 23 and the negative electrode 24, whereby the energy storage device 1 is charged-discharged.

The positive electrode 23 includes a strip-like metal foil 231 and a positive active material layer 232 overlapped on the metal foil 231. The positive active material layer 232 is overlapped on the metal foil 231 in a state where one end edge portion (uncovered portion) of the metal foil 231 in the width direction is exposed. The metal foil 231 of the present embodiment is, for example, an aluminum foil.

The negative electrode 24 includes a strip-like metal foil 241 and a negative active material layer 242 overlapped on the metal foil 241. The negative active material layer 242 is overlapped on the metal foil 241 in a state where the other end edge portion (uncovered portion) of the metal foil 241 in the width direction (on the side opposite to the uncovered portion of the metal foil 231 of the positive electrode 23) is exposed. The metal foil 241 of the present embodiment is, for example, a copper foil.

In the electrode assembly 2 of the present embodiment, the positive electrode 23 and the negative electrode 24 are wound in a state of being insulated from each other by the separator 25. That is, in the layered product 21 of the present embodiment, the positive electrode 23, the negative electrode 24, and the separator 25 are layered.

The separator 25 is a member having an insulating property and is disposed between the positive electrode 23 and the negative electrode 24. With such a configuration, in the electrode assembly 2 (specifically, the layered product 21), the positive electrode 23 and the negative electrode 24 are insulated from each other. The separator 25 holds an electrolyte solution in the case 3. With such a configuration, at the time of charge-discharge of the energy storage device 1, lithium ions can move between the positive electrode 23 and the negative electrode 24 which are alternately layered with the separator 25 interposed therebetween.

The separator 25 has a strip shape, and is formed of, for example, a porous film of polyethylene, polypropylene, cellulose, polyamide, or the like. The separator 25 of the present embodiment includes a substrate formed of a porous film and an inorganic layer provided on the substrate. The inorganic layer contains inorganic particles such as $SiO_2$ particles, $Al_2O_3$ particles, and boehmite (alumina hydrate). The substrate is made of, for example, polyethylene.

The dimension of the separator 25 in the width direction is larger than the width of the negative active material layer 242. The separator 25 is disposed between the positive electrode 23 and the negative electrode 24 overlaid on each other in a state where the positive active material layer 232 and the negative active material layer 242 are displaced in the width direction so as to be overlapped on each other in the thickness direction (layering direction). At this time, the uncovered portion of the positive electrode 23 and the uncovered portion of the negative electrode 24 do not overlap each other. That is, the uncovered portion of the positive electrode 23 protrudes in the width direction (direction orthogonal to the layering direction) from the region where the positive electrode 23 and the negative electrode 24 overlap each other, and the uncovered portion of the negative electrode 24 protrudes in the width direction (direction opposite to the protruding direction of the uncovered portion of the positive electrode 23) from the region where the positive electrode 23 and the negative electrode 24 overlap each other. The electrode assembly 2 is formed by winding the positive electrode 23, the negative electrode 24, and the separator 25 around the winding core 20 in such a layered state (relative position). In the electrode assembly 2 of the present embodiment, an uncovered layered portion 26 in the electrode assembly 2 is formed by a portion where only the uncovered portion of the positive electrode 23 or the uncovered portion of the negative electrode 24 is layered.

The uncovered layered portion 26 is provided on each electrode of the electrode assembly 2. That is, the uncovered layered portion 26 in which only the uncovered portion of the positive electrode 23 is layered forms an uncovered layered portion of the positive electrode in the electrode assembly 2, and the uncovered layered portion 26 in which only the uncovered portion of the negative electrode 24 is layered forms an uncovered layered portion of the negative electrode in the electrode assembly 2.

The case 3 stores an electrolyte solution together with the electrode assembly 2. Specifically, the case 3 includes a case main body 31 having an opening, and a lid plate 32 that closes the opening of the case main body 31. The case 3 is made of metal having resistance to an electrolyte solution. The case 3 of the present embodiment is made of, for example, aluminum or an aluminum-based metal such as an aluminum alloy.

The electrolyte solution is a non-aqueous electrolytic solution. The electrolyte solution is obtained by dissolving electrolyte salt in an organic solvent. Examples of the organic solvent include cyclic carbonate esters such as propylene carbonate and ethylene carbonate, and chain carbonates such as dimethyl carbonate, diethyl carbonate, and ethyl methyl carbonate. Examples of the electrolyte salt include $LiClO_4$, $LiBF_4$, and $LiPF_6$. The electrolyte solution of the present embodiment is obtained by dissolving 1 mol/L of $LiPF_6$ in a mixed solvent prepared by adjusting ethylene carbonate, dimethyl carbonate, and ethyl methyl carbonate at a ratio of ethylene carbonate:dimethyl carbonate:ethyl methyl carbonate=3:2:5.

The case main body 31 includes a plate-like closing portion 311 and a tubular body portion (peripheral wall) 312 connected to a peripheral edge of the closing portion 311.

The closing portion 311 is a portion positioned at a lower end of the case main body 31 when the case main body 31 is disposed in a posture in which the opening faces upward (that is, serving as a bottom wall of the case main body 31 when the opening faces upward). The closing portion 311 has a rectangular shape as viewed from the normal direction of the closing portion 311.

The body portion 312 has a square tube shape, more specifically, a flat square tube shape. The body portion 312 includes a pair of long wall portions 313 extending from the long sides at the peripheral edge of the closing portion 311, and a pair of short wall portions 314 extending from the short sides at the peripheral edge of the closing portion 311. That is, the pair of long wall portions 313 face each other at an interval (specifically, an interval corresponding to the short side at the peripheral edge of the closing portion 311) in the Y axis direction, and the pair of short wall portions 314 face each other at an interval (specifically, an interval corresponding to the long side at the peripheral edge of the closing portion 311) in the X axis direction. The short wall portions 314 connect corresponding end portions (specifically, facing each other in the Y axis direction) of the pair of long wall portions 313 to each other, thereby forming the body portion 312 having a square tube shape.

As described above, the case main body 31 has a square tube shape
in which one end portion in the opening direction (Z axis direction) is closed (that is, a bottomed square tube shape).

The lid plate 32 is a plate-like member that closes the opening of the case main body 31. The lid plate 32 of the present embodiment is a rectangular plate member that is long in the X axis direction as viewed in the Z axis direction. In the lid plate 32, the peripheral edge portion of the lid plate 32 is overlapped on an opening peripheral edge portion 34 of the case main body 31 so as to close the opening of the case main body 31.

The external terminal 4 is a portion which is electrically connected to an external terminal of another energy storage device, an external device, or the like. The external terminal 4 is formed of a member having conductivity. For example, the external terminal 4 is formed of a metal material having high weldability, such as an aluminum-based metal material such as aluminum or an aluminum alloy, or a copper-based metal material such as copper or a copper alloy.

Specifically, the external terminal 4 includes a terminal main body 41 having a surface 41A to which a bus bar or the like can be welded, and a penetrating portion penetrating the case 3.

The terminal main body 41 is a plate-like portion spreading along the lid plate 32. The terminal main body 41 of the present embodiment has a rectangular shape as viewed in the Z axis direction.

The penetrating portion causes current to pass through the current collector 5 disposed inside the case 3 and the terminal main body 41 disposed outside the case 3. The penetrating portion of the present embodiment is made of metal having conductivity and is formed integrally with the terminal main body 41. The penetrating portion penetrates the lid plate 32 from the terminal main body 41 and extends into the case 3. Specifically, the penetrating portion extends from the terminal main body 41 into the case 3, and sandwiches the lid plate 32, the current collector 5, and the like in the Z axis direction in cooperation with the terminal main body 41. As a result, the external terminal 4 and the current collector 5 are fixed to the lid plate 32, and the external terminal 4 and the current collector 5 are electrically connected to each other.

Figure 4:
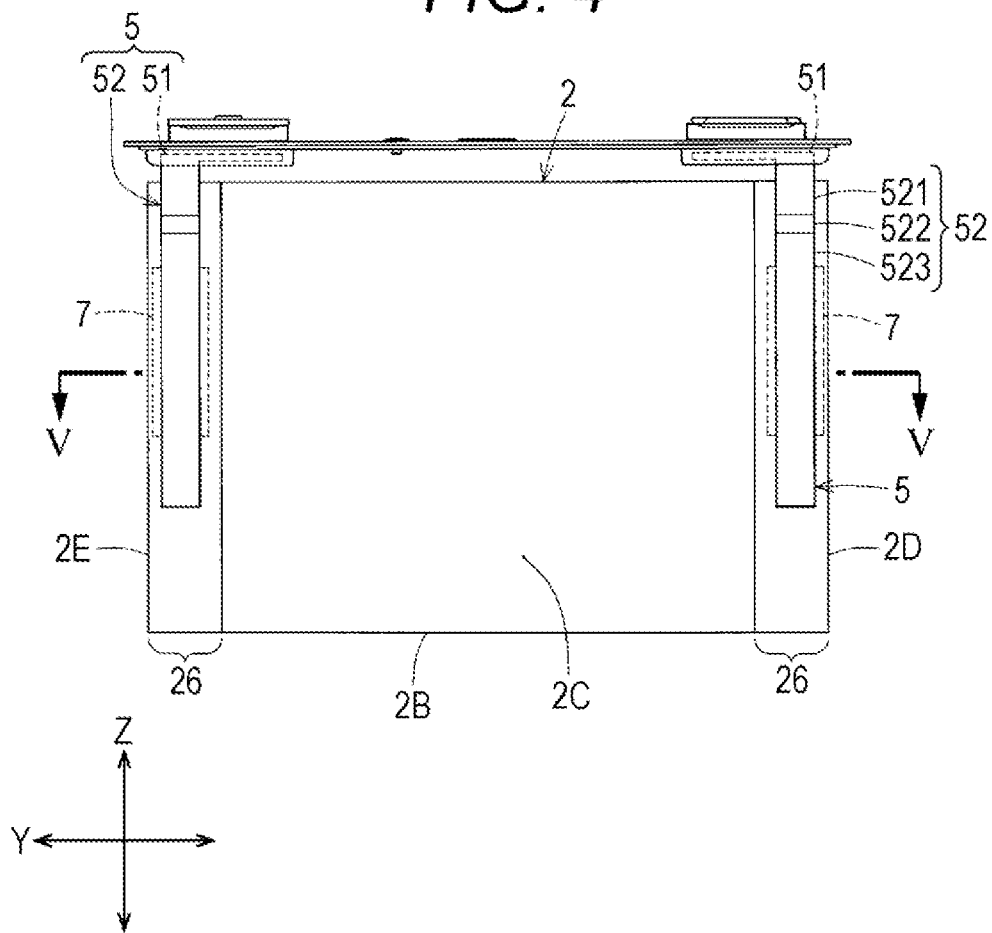
FIG. 4 is a view of a state in which external terminals, current collectors, and the electrode assembly are assembled to a lid plate.
Figure 5:
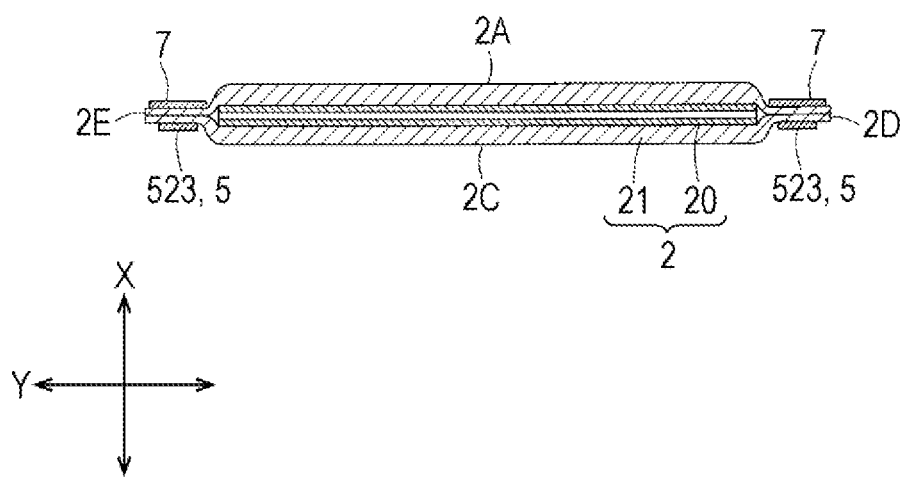
FIG. 5 is a cross-sectional view taken along the line V-V in FIG. 4.

The current collectors 5 are disposed in the case 3 and are directly or indirectly connected to the electrode assembly 2 in a conductive manner. As also shown in FIG. 4 and FIG. 5, the current collectors 5 of the present embodiment are connected to the electrode assembly 2 (specifically, the uncovered layered portions 26) in a state where the uncovered layered portions 26 of the electrode assembly 2 are sandwiched between the current collectors 5 and the rectangular plate-like members 7.

The current collector 5 is formed of a member having conductivity. Accordingly, the current collector 5 connects the penetrating portion of the external terminal 4 and the uncovered layered portion 26 of the electrode assembly 2 in a conductive manner. The current collectors 5 are disposed along the inner surface of the case 3.

To be more specific, the current collector 5 includes: a first connecting portion 51 which is connected to the penetrating portion of the external terminal 4 in a conductive manner; and a second connecting portion 52 which extends from the first connecting portion 51 and is connected to the electrode assembly 2 in a conductive manner. In the current collector 5, the first connecting portion 51 extends from the penetrating portion of the external terminal 4 toward the short wall portion 314 along the lid plate 32, and the second connecting portion 52 extends from the end portion of the first connecting portion 51 on the short wall portion 314 side toward the closing portion 311 along the long wall portion 313.

The first connecting portion 51 is a rectangular plate-like portion. The second connecting portion 52 is a strip plate-like portion, and includes a base portion 521 extending in the Z axis direction along the long wall portion 313, an inclined portion 522 extending from the base portion 521 in an inclined direction with respect to the base portion 521, and a joining portion 523 extending from the inclined portion 522 in the Z axis direction.

The current collector 5 thus configured is formed by bending a plate-like metal material cut into a predetermined shape. In the energy storage device 1 of the present embodiment, the joining portion 523 of the current collector 5 and the plate-like member 7 are joined to each other by ultrasonic joining in a state where the uncovered layered portion 26 of the electrode assembly 2 is sandwiched therebetween. That is, the joining portion 523 of the current collector 5, the uncovered layered portion 26 of the electrode assembly 2, and the plate-like member 7 are joined to each other by ultrasonic joining in a state of being overlaid on each other.

Figure 6:
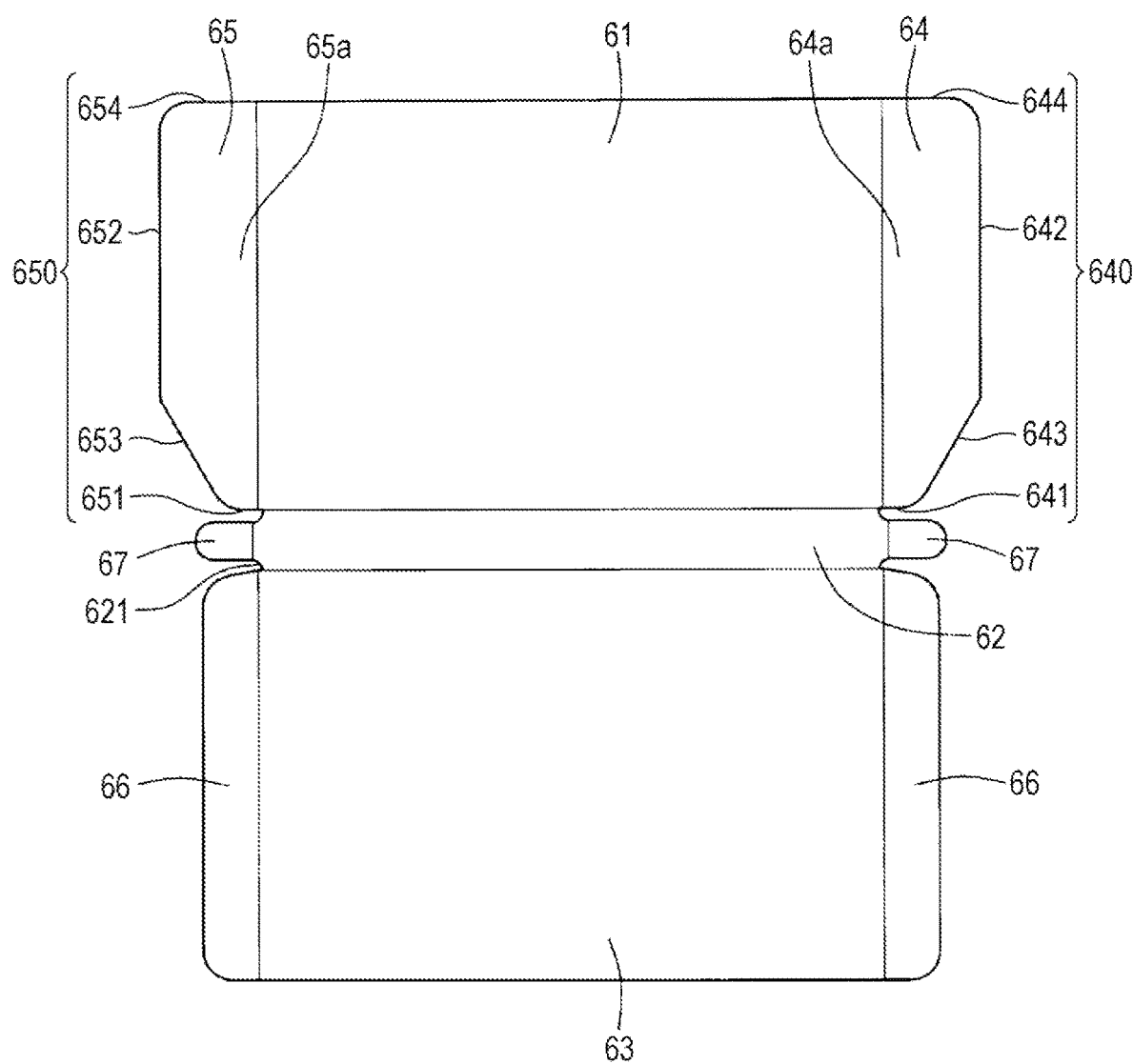
FIG. 6 is a developed view of an insulating member provided in the energy storage device.

The insulating member 6 is formed of a member having an insulating property. As shown in FIG. 6, the insulating member 6 is formed of a sheet-like member. The insulating member 6 of the present embodiment is formed of, for example, resin such as polypropylene or polyphenylene sulfide. The thickness dimension of the insulating member 6 is 0.13 mm to 0.19 mm. The insulating member 6 of the present embodiment is formed in a bag shape by bending a sheet-like member having an insulating property which is cut into a predetermined shape (see FIG. 2).

Specifically, as also shown in FIGS. 2 to 5, the insulating member 6 includes a first portion 61 corresponding to a first surface 2A of the electrode assembly 2 in the X axis direction, a second portion 62 corresponding to a first end surface 2B which is an end surface of the electrode assembly 2 in the Z axis direction, a third portion 63 corresponding to a second surface 2C of the electrode assembly 2 in the X axis direction, and a first extending portion 64 and a second extending portion 65 extending from the first portion 61. In addition, the insulating member 6 of the present embodiment includes a pair of folded portions 66 extending from the third portion 63 and a pair of piece portions 67 extending from the second portion 62.

In a state where the insulating member 6 is spread in a planar shape (developed state: see FIG. 6), the first portion 61, the second portion 62, and the third portion 63 are sequentially and continuously arranged in one direction (hereinafter, also referred to as an "arrangement direction": up-down direction in FIG. 6). The first extending portion 64 extends from one end portion of the first portion 61 in a direction orthogonal to the arrangement direction (hereinafter, also referred to as an "orthogonal direction": left-right direction in FIG. 6), and the second extending portion 65 extends from the other end portion of the first portion 61 in the orthogonal direction. The pair of folded portions 66 extend from both end portions of the third portion 63 in the orthogonal direction. The pair of piece portions 67 extend from both end portions of the second portion 62 in the orthogonal direction.

Each of the first portion 61 and the third portion 63 has a rectangular shape as viewed from the normal direction of each of the portions 61 and 63, and has a size corresponding to the first surface 2A or the second surface 2C of the electrode assembly 2. The first portion 61 and the third portion 63 of the present embodiment have the same shape and size. Specifically, the first portion 61 and the third portion 63 have a rectangular shape elongated in the orthogonal direction.

The second portion 62 is a portion connecting the first portion 61 and the third portion 63, and is a strip-like portion as viewed from the normal direction of the portion 63. The second portion 62 has a size corresponding to the first end surface 2B of the electrode assembly 2. In the present embodiment, the length dimension of the second portion 62 in the orthogonal direction is the same as the length dimension of the first portion 61 and the third portion 63 in the orthogonal direction. The length dimension of the second portion 62 in the arrangement direction is the same as or slightly smaller than the dimension (thickness dimension) of the electrode assembly 2 in the X axis direction. Specifically, the second portion 62 has a strip shape elongated in the orthogonal direction. The four corners of the second portion 62 are cut out in an arc shape. That is, the second portion 62 has cutout portions 621 at the four corners. The first end surface 2B of the electrode assembly 2 is a surface of a curved portion of the electrode assembly 2, and a size corresponding to the first end surface 2B of the electrode assembly 2 is the same as or substantially the same as a size obtained by projecting the first end surface 2B in the Z axis direction.

The first extending portion 64 and the second extending portion 65 extend in opposite directions from both end portions of the first portion 61 in the orthogonal direction, and are wound around the electrode assembly 2 so as to sequentially face the second end surface 2D which is one end surface or the third end surface 2E which is the other end surface and the second surface 2C of the electrode assembly 2 in the orthogonal direction. The second end surface 2D and the third end surface 2E of the electrode assembly 2 in the present embodiment are end surfaces of the electrode assembly 2 in the direction of the winding axis C, and are surfaces (virtual surfaces) defined by end edges of a large number of the electrodes 22 (uncovered portions) sandwiched (bundled) between the current collectors 5 and the plate-like members 7.

Figure 9:
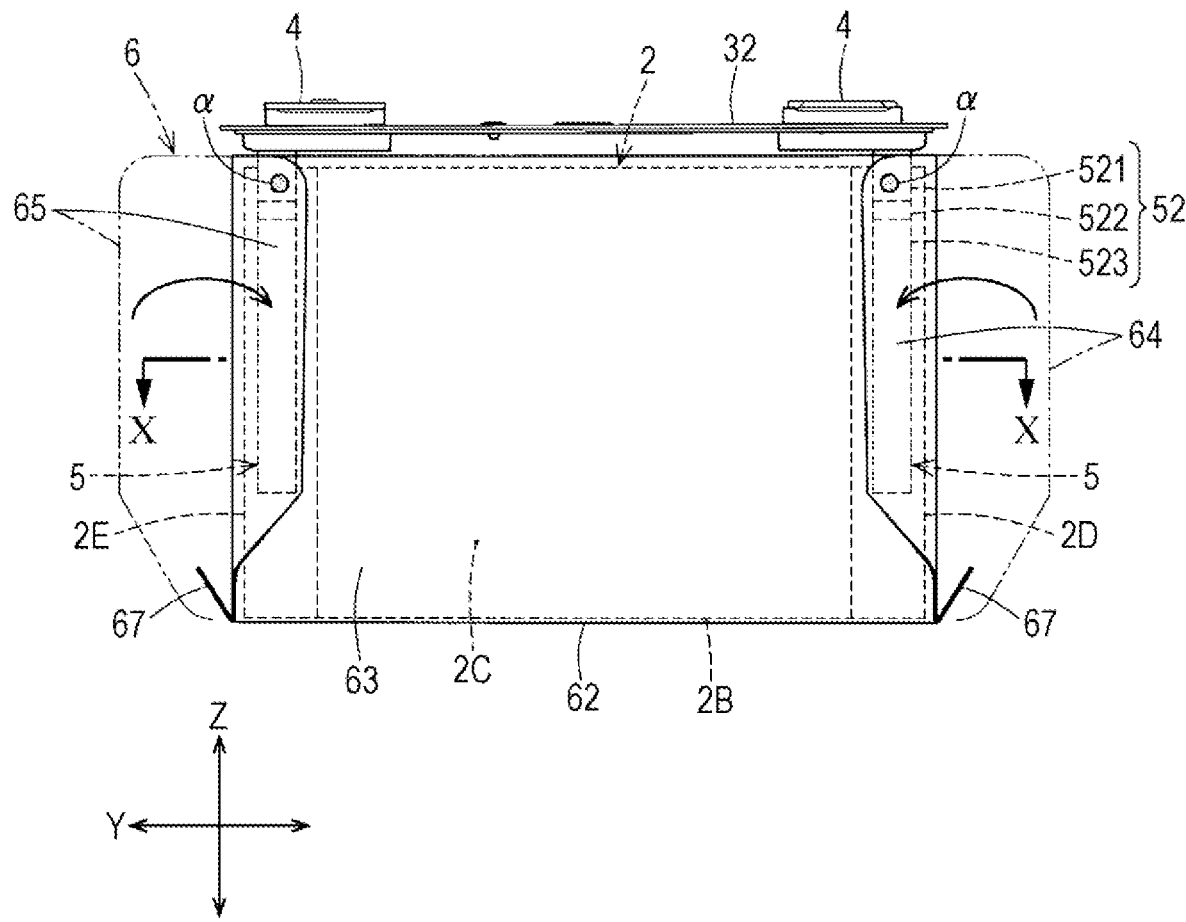
FIG. 9 is a view for explaining a process of winding a first extending portion and a second extending portion around the electrode assembly in the manufacturing method.

The length dimension of each of the first extending portion 64 and the second extending portion 65 in the orthogonal direction is set such that the distal end edges (second side portions) 642 and 652 are positioned closer to the center side of the electrode assembly 2 in the orthogonal direction than the current collectors 5 (first connecting portions 51) on the second surface 2C of the electrode assembly 2 in a state where the first extending portion 64 and the second extending portion 65 are wound around the electrode assembly 2 (see FIG. 9).

The first extending portion 64 and the second extending portion 65 of the present embodiment are substantially trapezoidal portions as viewed in the normal direction of the portions 64 and 65. Specifically, outer edges 640 and 650 of the first extending portion 64 and the second extending portion 65 includes first side portions 641 and 651 extending in the orthogonal direction from the end portions of the first portion 61 on the second portion 62 side, second side portions 642 and 652 constituting the distal end edges of the first extending portion 64 and the second extending portion 65 and extending in the arrangement direction, and third side portions 643 and 653 extending in a direction inclined with respect to both side portions of the first side portions 641 and 651 and the second side portions 642 and 652 between the first side portions 641 and 651 and the second side portions 642 and 652. The outer edges 640 and 650 of the first extending portion 64 and the second extending portion 65 include fourth side portions 644 and 654 extending in the orthogonal direction from the end portions of the first portion 61 on the side opposite to the second portion 62. In the first extending portion 64 and the second extending portion 65 of the present embodiment, each of the boundary portions between the second side portions 642 and 652 and the fourth side portions 644 and 654 and the boundary portions between the first side portions 641 and 651 and the third side portions 643 and 653 has an arc shape protruding outward.

The pair of folded portions 66 extend in opposite directions from both end portions of the third portion 63 in the orthogonal direction, and each have a strip shape as viewed from the normal direction of the portion 66. In each folded portion 66 of the present embodiment, the length dimension in the arrangement direction is the same as the length dimension of the third portion 63, and the length dimension in the orthogonal direction is smaller than the dimension (thickness dimension) of the electrode assembly 2 in the X axis direction. Each corner portion of each folded portion 66 on the side opposite to the third portion 63 has an arc shape protruding outward.

The pair of piece portions 67 extend in opposite directions from both end portions of the second portion 62 in the orthogonal direction, and a distal end of each piece portion 67 has an arc shape.

In the insulating member 6 configured in the developed state as described above, the distal end portions of the first extending portion 64 and the second extending portion 65 and the third portion 63 are welded to each other in a state where the respective portions 61 to 67 are bent or wound so as to cover the surface of the electrode assembly 2, whereby the bag shape is maintained.

In this bag shape state, that is, in a state where the surface of the electrode assembly 2 is covered, the insulating member 6 is bent such that folds are formed at a boundary position between the first portion 61 and the second portion 62, a boundary position between the first portion 61 and the first extending portion 64, a boundary position between the first portion 61 and the second extending portion 65, a boundary position between the second portion 62 and the third portion 63, a boundary position between the third portion 63 and each folded portion 66, and a boundary position between the second portion 62 and each piece portion 67.

Next, a method for manufacturing the energy storage device 1 configured as described above will be described.

First, the electrode assembly 2, the current collectors 5, the plate-like members 7, and the external terminals 4 are assembled to the lid plate 32.

Figure 7:
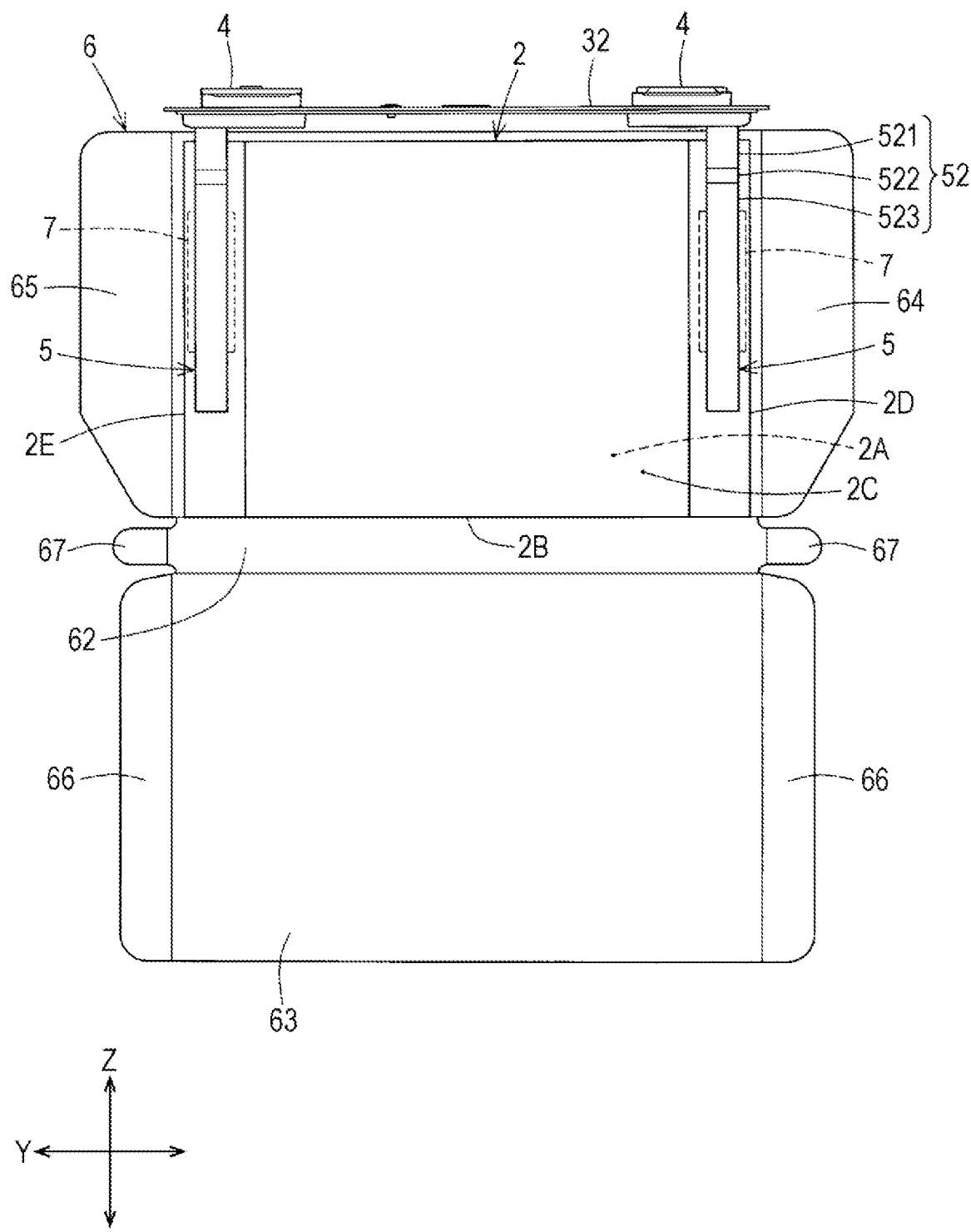
FIG. 7 is a view showing a state where the electrode assembly assembled to the lid plate is disposed on the insulating member.
Figure 8:
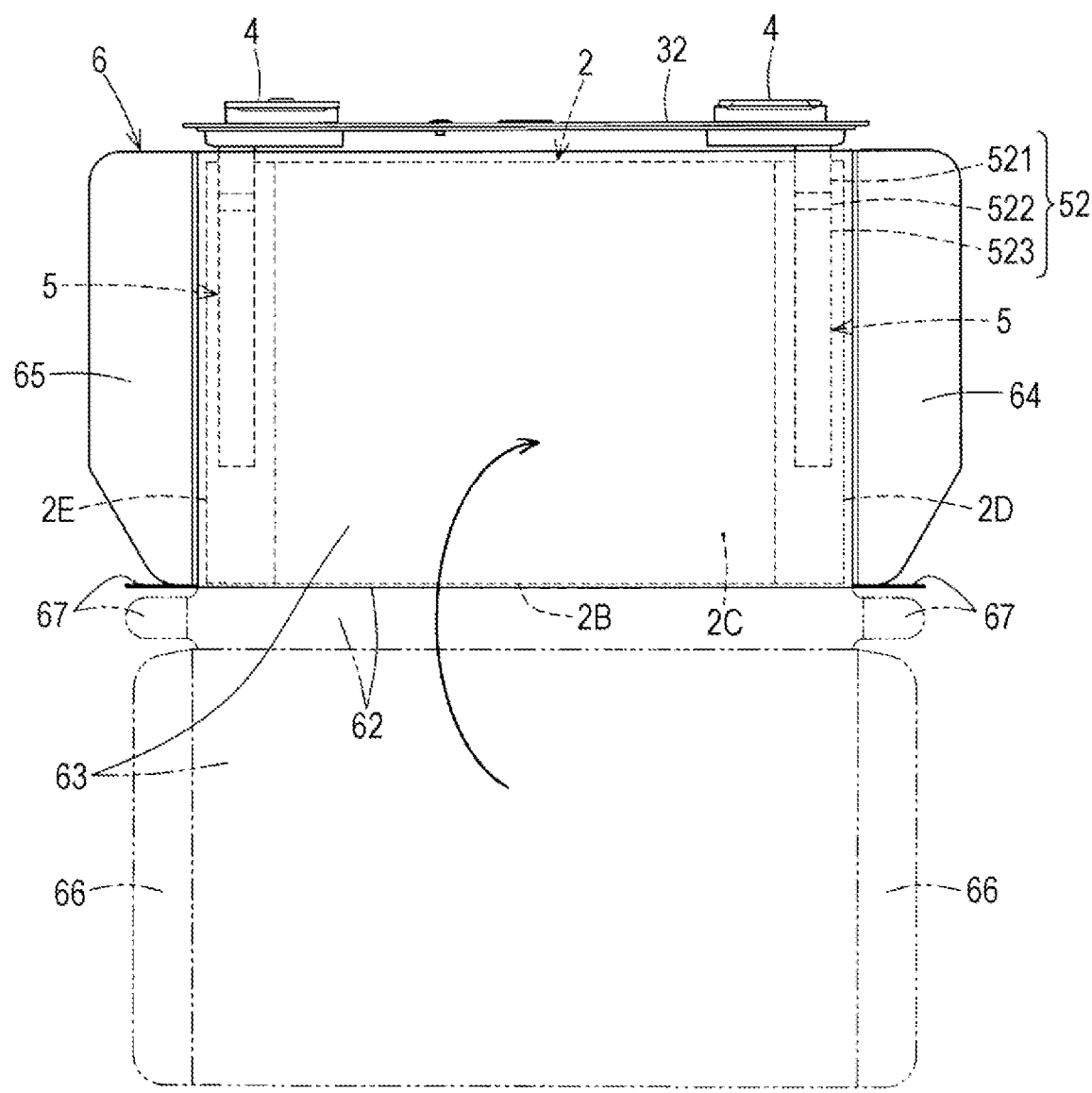
FIG. 8 is a view for explaining a process of causing a first portion to a third portion of the insulating member to follow a surface of the electrode assembly in a method for manufacturing the energy storage device.

Next, as shown in FIGS. 7 and 8, the first portion 61, the second portion 62, and the third portion 63 of the insulating member 6 are caused to follow the corresponding surfaces (first surface 2A, first end surface 2B, second surface 2C) of the electrode assembly 2.

Figure 10:
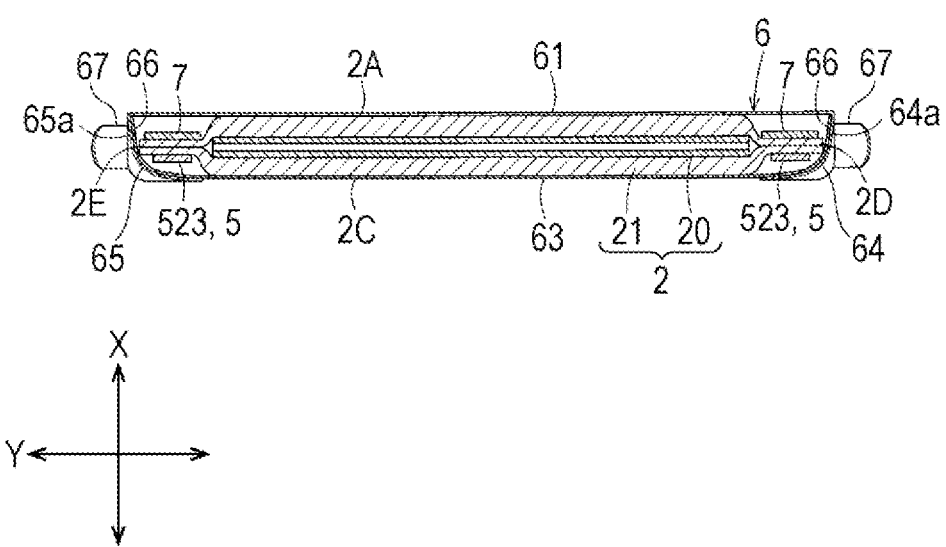
FIG. 10 is a cross-sectional view taken along the line X-X in FIG. 9.

Subsequently, as also shown in FIGS. 9 and 10, the first extending portion 64 is wound around the electrode assembly 2 so as to sequentially face the second end surface 2D and the second surface 2C of the electrode assembly 2 from a portion (base portion) adjacent to the first portion 61 toward the distal end side, and the second extending portion 65 is wound around the electrode assembly 2 so as to sequentially face the third end surface 2E and the second surface 2C of the electrode assembly 2 from a portion (base portion) adjacent to the first portion 61 toward the distal end side. At this time, the first extending portion 64 and the second extending portion 65 are wound around the electrode assembly 2 so as to overlap the outer sides of the third portion 63.

In this state, the first extending portion 64 and the second extending portion 65 are pulled in a direction in which their distal ends approach each other, whereby the electrode assembly 2 is fastened by the first extending portion 64, the first portion 61, and the second extending portion 65. In the method for manufacturing the energy storage device 1 of the present embodiment, the first extending portion 64 and the second extending portion 65 are pulled in a direction in which the first extending portion 61 and the second extending portion 65 approach each other so that the end portion of the electrode assembly 2 on the external terminal 4 side (that is, the assembled lid plate 32 side) is fastened by the end portions of the first extending portion 64, the first portion 61, and the second extending portion 65 on the external terminal 4 side.

Subsequently, in a state where the first extending portion 64 and the second extending portion 65 are pulled as described above, the first extending portion 64 and the third portion 63 are welded to each other and the second extending portion 65 and the third portion 63 are welded to each other at positions overlapping the base portions 521 of the second connecting portions 52 of the current collectors 5 (see welded portions indicated by reference sign a in FIG. 9).

In this state, a portion 64a of the first extending portion 64 which is adjacent to the first portion 61 (that is, the boundary portion with the first portion 61) is bent toward the second surface 2C of the electrode assembly 2 with respect to the first portion 61 to face the second end surface 2D, and at least a part of the remaining portion of the first extending portion 64 is curved to follow the electrode assembly 2 (see FIGS. 6 and 10). Further, a portion 65a of the second extending portion 65 which is adjacent to the first portion 61 (that is, the boundary portion with the first portion 61) is bent toward the second surface 2C of the electrode assembly 2 with respect to the first portion 61 to face the third end surface 2E, and at least a part of the remaining portion of the second extending portion 65 is curved to follow the electrode assembly 2 (see FIGS. 6 and 10).

Figure 11:
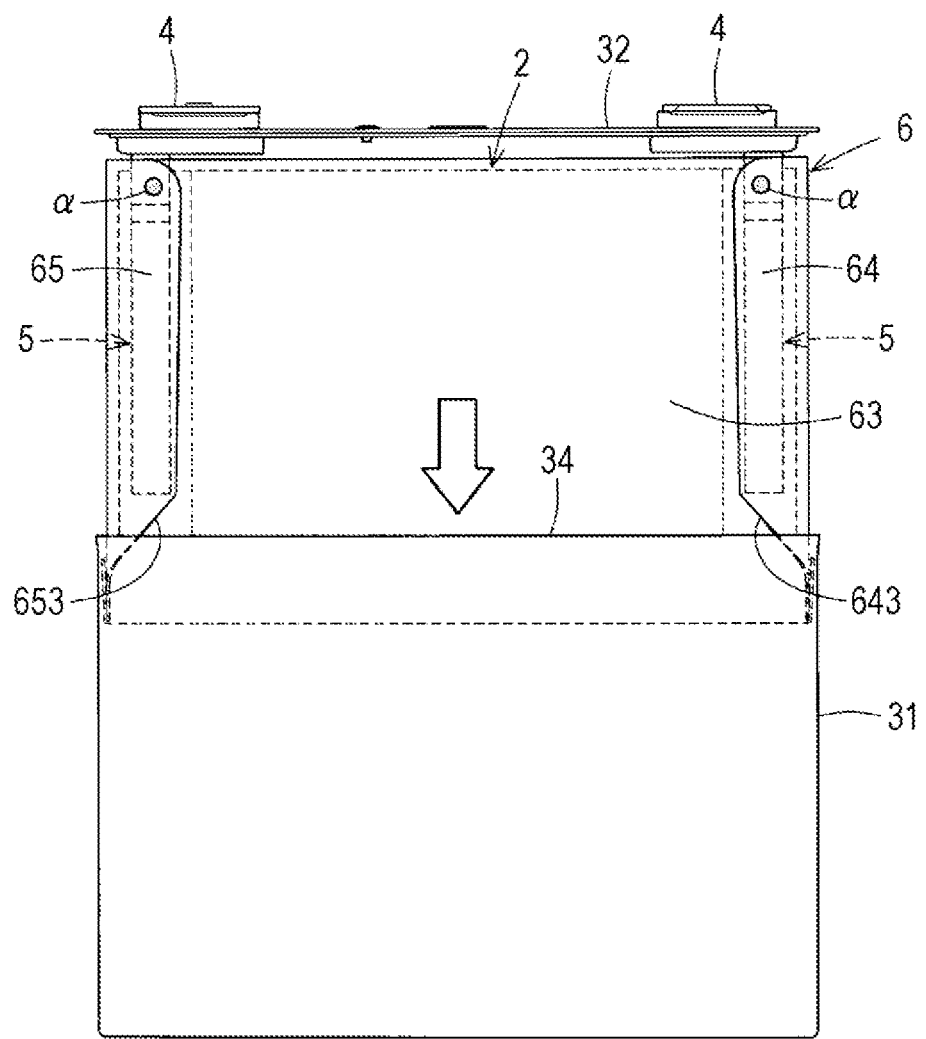
FIG. 11 is a view for explaining a process of inserting the electrode assembly in a state where the sheet-like insulating member is caused to follow the surface of the electrode assembly into a case in the manufacturing method.

Subsequently, as shown in FIG. 11, the electrode assembly 2 is inserted into the case main body 31 in a state where the insulating member 6 follows the surface of the electrode assembly 2. At this time, the electrode assembly 2 is inserted into the case main body 31 in a state where the end portion on the external terminal 4 side is fastened by the first extending portion 64, the first portion 61, and the second extending portion 65 as described above.

When the electrode assembly 2 is inserted into the case main body 31, the corner portions of the first extending portion 64 and the second extending portion 65 on the insertion direction side into the case main body 31 are constituted by the third side portions 643 and 653 inclined with respect to the insertion direction of the electrode assembly 2 into the case main body 31, so that the first extending portion 64 and the second extending portion 65 are prevented from being caught by the opening peripheral edge portion 34 of the case main body 31, whereby damage to the insulating member 6 caused by the catching is prevented.

When the electrode assembly is continuously inserted into the case main body and the peripheral edge portion of the lid plate 32 is overlapped on the opening peripheral edge portion 34 of the case main body 31 such that the lid plate 32 closes the opening of the case main body 31, the boundary portion between the lid plate 32 and the case main body 31 is welded in a state where the opening peripheral edge portion 34 and the lid plate 31 are overlapped. The lid plate 32 and the case main body 31 of the present embodiment are welded to each other by laser welding.

After the case main body 31 and the lid plate 32 are welded to each other, an electrolyte solution is injected into the case 3 to complete the energy storage device 1.

According to the method for manufacturing the energy storage device 1 described above, the electrode assembly 2 is inserted into the case 3 (specifically, the case main body 31) in a state where the electrode assembly 2 is fastened by the first extending portion 64 and the second extending portion 65 and hence, in the completed energy storage device 1, an interval between the electrodes 22 constituting the electrode assembly 2 is less likely to change. With such a configuration, in the energy storage device 1 manufactured by the above-mentioned manufacturing method, lowering (deterioration) of battery performance caused by a change in the interval between the electrodes 22 of the electrode assembly 2 can be suppressed.

In the method for manufacturing an energy storage device according to the present embodiment, when the electrode assembly 2 is inserted into the case 3, as shown in FIG. 10, the portion 64a of the first extending portion 64 which is adjacent to the first portion 61 is bent toward the second surface 2C of the electrode assembly 2 with respect to the first portion 61 to face the second end surface 2D, and at least a part of the remaining portion of the first extending portion 64 is curved to follow the electrode assembly 2. Further, the portion 65a of the second extending portion 65 which is adjacent to the first portion 61 is bent toward the second surface 2C of the electrode assembly 2 with respect to the first portion 61 to face the third end surface 2E, and at least a part of the remaining portion of the second extending portion 65 is curved to follow the electrode assembly 2.

As described above, the insulating member 6 is bent only at one corner portion (corner portion constituted by the first portion 61 and the first extending portion 64) of both corner portions of the first extending portion 64 wound around the electrode assembly 2 in the thickness direction (X axis direction) of the electrode assembly 2. For this reason, the first extending portion 64 easily follows the electrode assembly 2 when wound around the electrode assembly 2, whereby the electrode assembly 2 is sufficiently fastened by the first extending portion 64. Further, the insulating member 6 is bent only at one corner portion (corner portion constituted by the first portion 61 and the second extending portion 65) of both corner portions of the second extending portion 65 wound around the electrode assembly 2 in the thickness direction (X axis direction) of the electrode assembly 2. For this reason, the second extending portion 65 easily follows the electrode assembly 2 when wound around the electrode assembly 2, whereby the electrode assembly 2 is sufficiently fastened also by the second extending portion 65. As a result, in the electrode assembly 2 of the completed energy storage device 1, the interval between the electrodes 22 is further less likely to change.

The energy storage device and the method for manufacturing the energy storage device of the present invention are not limited to the above embodiment, and as a matter of course, various changes can be made without departing from the scope of the gist of the present invention. For example, the configuration of one embodiment can be added to the configuration of another embodiment, and a part of the configuration of one embodiment can be replaced with the configuration of another embodiment. In addition, a part of the configuration of one embodiment can be deleted.

The insulating member 6 of the above embodiment includes two extending portions (the first extending portion 64 and the second extending portion 65), but is not limited to this configuration. The insulating member 6 may include one extending portion (the first extending portion 64 or the second extending portion 65).

In the insulating member 6 of the above embodiment, the dimension of each of the first extending portion 64 and the second extending portion 65 in the direction extending from the first portion 61 (orthogonal direction in the developed state) is a dimension in which the distal end (second side portion) is located on the second surface 2C when the insulating member 6 is wound around the electrode assembly 2 for fastening the electrode assembly 2, but the present invention is not limited to this configuration. The dimension of each of the first extending portion 64 and the second extending portion 65 may be such that the first extending portion 64 or the second extending portion 65 is wound around the entire circumference of the electrode assembly 2.

The specific shapes (contour shapes) of the first extending portion 64 and the second extending portion 65 of the insulating member 6 are not limited. The outer edges 640 and 650 of the first extending portion 64 and the second extending portion 65 of the above embodiment include the third side portions 643 and 653 extending in the direction inclined with respect to both side portions 641, 651, 642, and 652 of the first side portions 641 and 651 and the second side portions 642 and 652 between the first side portions 641 and 651 and the second side portions 642 and 652. However, for example, the third side portions 643 and 653 may not be provided, and the first side portions 641 and 651 and the second side portions 642 and 652 may be connected to each other.

The electrode assembly 2 of the energy storage device 1 of the above embodiment is a so-called winding-type electrode assembly in which the elongated strip-like electrodes 22 are wound, but the present invention is not limited to this configuration. The electrode assembly 2 may be a so-called stack-type electrode assembly in which a plurality of sheet-like electrodes 22 are layered.

Further, in the above embodiment, the case has been described where the energy storage device is used as a chargeable-dischargeable nonaqueous electrolyte secondary battery (for example, a lithium ion secondary battery), but the type and size (capacity) of the energy storage device are freely selectable. Further, in the above embodiment, the lithium ion secondary battery has been described as an example of the energy storage device, but the present invention is not limited thereto. For example, the present invention can be applied to various secondary batteries, primary batteries, and energy storage devices of capacitors such as electric double layer capacitors.

Figure 12:
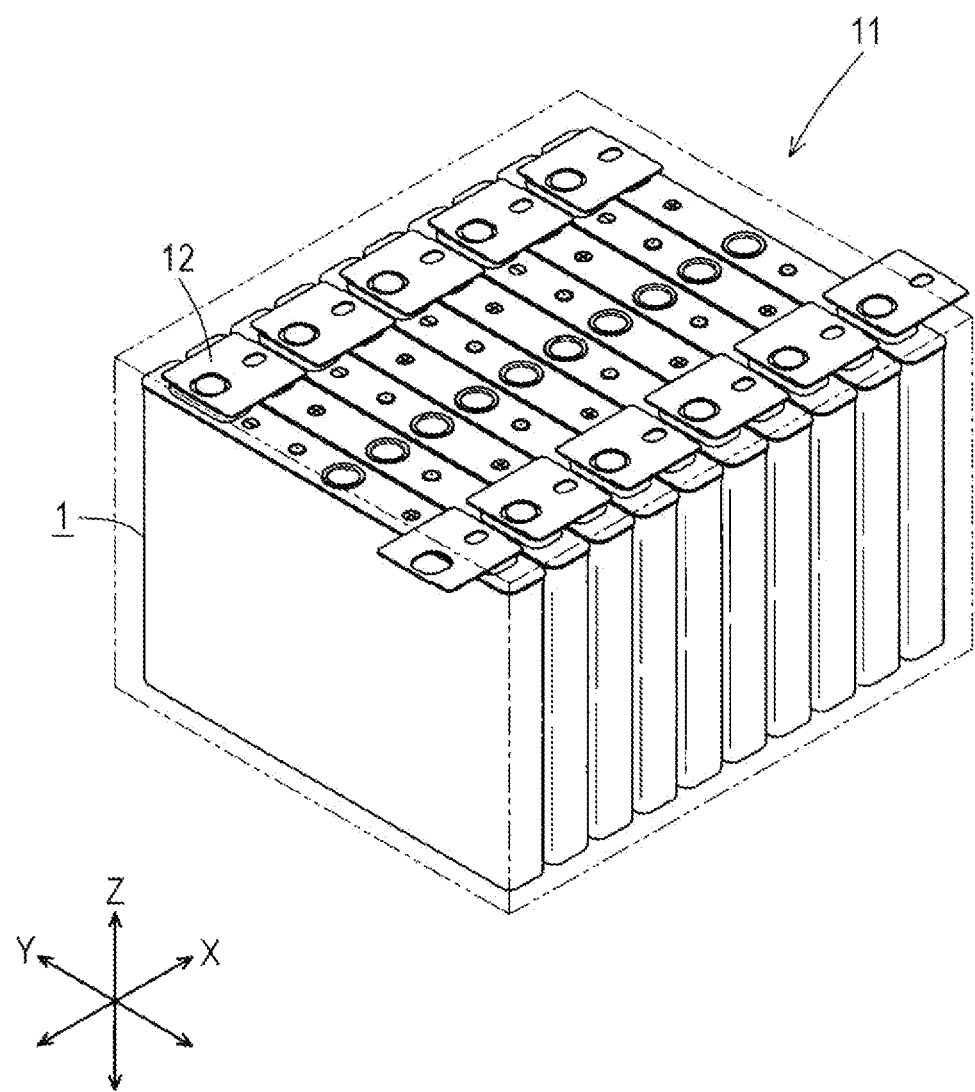
FIG. 12 is a schematic view showing an energy storage apparatus including the energy storage devices.
Figure 13:
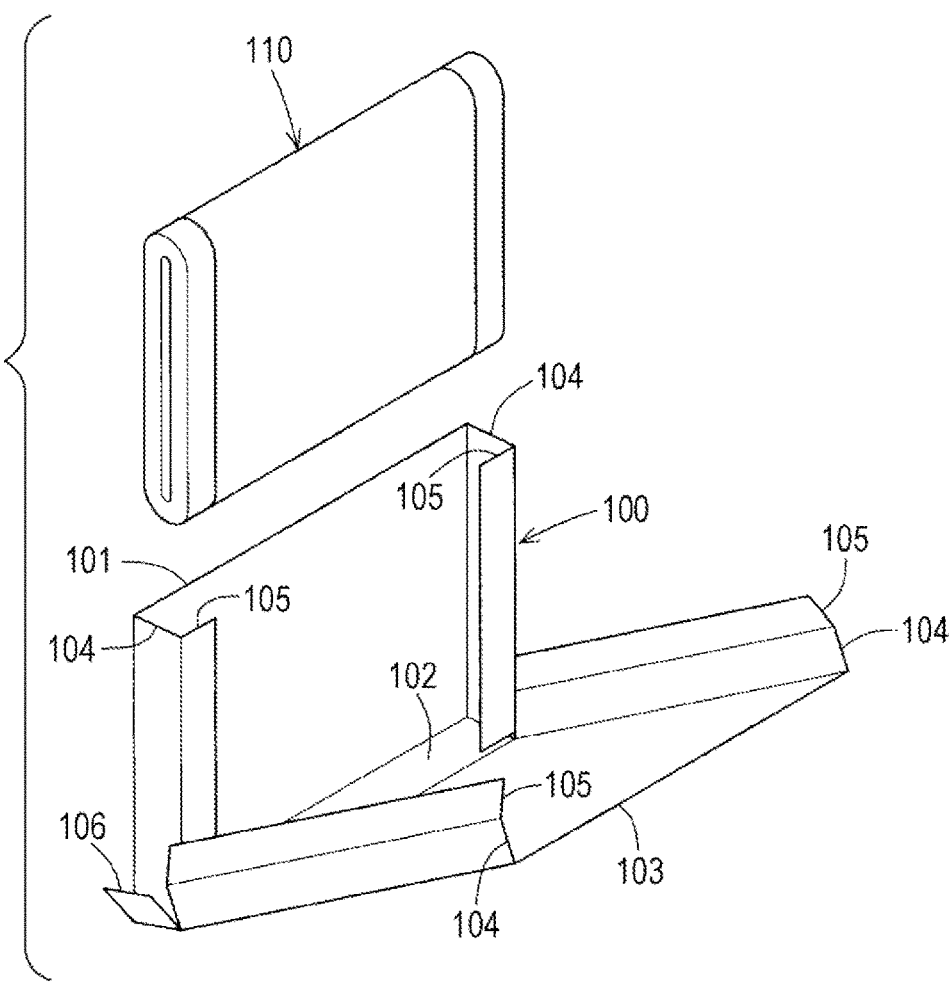
FIG. 13 is a perspective view showing a wound electrode assembly and an insulating resin sheet of a conventional prismatic nonaqueous electrolyte secondary battery.
Figure 14:
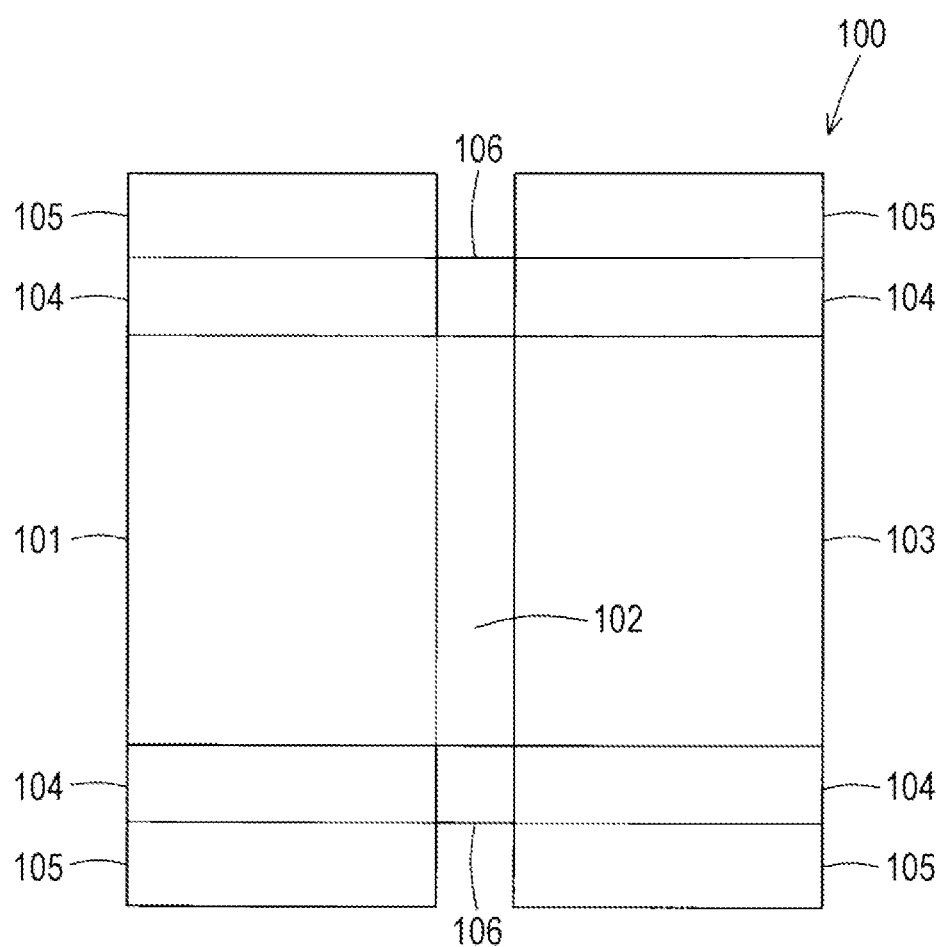
FIG. 14 is a developed view of the insulating resin sheet.

The energy storage device (for example, battery) 1 may be used in an energy storage apparatus (a battery module when the energy storage device is a battery) 11 as shown in FIG. 12. The energy storage apparatus 11 includes at least two energy storage devices 1 and bus bar members 12 which each electrically connects two (different) energy storage devices 1 to each other. In this case, the technique of the present invention may be applied to at least one energy storage device 1.

What is claimed is:

1. A method for manufacturing an energy storage device, the method comprising inserting an electrode assembly into a case while causing an insulating member having a sheet-like shape to follow a surface of the electrode assembly in which electrodes are layered,
    wherein the insulating member includes;
        a first portion corresponding to a first surface of the electrode assembly in a first direction which is a direction of a short side surface of the case and a thickness direction of the electrode assembly;
        a second portion corresponding to a first end surface which is an end surface of the electrode assembly in a second direction orthogonal to the first direction;
        a third portion corresponding to a second surface of the electrode assembly in the first direction; and
        a first extending portion extending from the first portion,
    the first extending portion includes:
        a portion adjacent to the first portion: and
        a distal end portion away from the first portion,
    in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion,
    in the insertion of the electrode assembly into the case, the first portion, the second portion, and the third portion of the insulating member are caused to follow corresponding surfaces of the electrode assembly, the first extending portion is wound around the electrode assembly such that a second end surface which is an end surface of the electrode assembly in a third direction orthogonal to each of the first direction and the second direction and the portion of the first extending portion which is adjacent to the first portion face each other, and the second surface and the distal end portion of the first extending portion face each other sequentially, and the electrode assembly is inserted in a state where the electrode assembly is fastened by the first extending portion,
    in the insertion of the electrode assembly into the case, in a state where the insulating member is caused to follow the surface of the electrode assembly, a boundary between the first portion and the first extending portion is located at a position corresponding to a boundary position between the first surface and the second end surface of the electrode assembly in the third direction, and
    among corners of the first extending portion wound around the electrode assembly in the first direction, only a corner constituted by the first portion and the first extending portion is bent into a fold toward the second surface of the electrode assembly with respect to the first portion such that the first extending portion faces the second end surface, and at least a part of a remaining portion of the first extending portion is curved so that the first extending portion follows the electrode assembly.

2. The method for manufacturing an energy storage device according to claim 1, wherein
    the insulating member includes a second extending portion extending from an end portion of the first portion opposite to the end portion from which the first extending portion extends, and
    in the insertion of the electrode assembly into the case, the second extending portion is wound around the electrode assembly from a portion adjacent to the first portion toward a distal end side so as to face a third end surface which is an end surface opposite to the second end surface of the electrode assembly in the third direction and the second surface in this order, and the electrode assembly is inserted in a state where the electrode assembly is fastened by the second extending portion.

3. The method for manufacturing an energy storage device according to claim 2, wherein
    in the insertion of the electrode assembly into the case, in a state where the insulating member is caused to follow the surface of the electrode assembly, a boundary between the first portion and the second extending portion is located at a position corresponding to a boundary position between the first surface and the third end surface of the electrode assembly in the third direction, and
    the portion of the second extending portion which is adjacent to the first portion is bent toward the second surface of the electrode assembly with respect to the first portion to face the third end surface, and at least a part of a remaining portion of the second extending portion is curved so that the second extending portion follows the electrode assembly.

4. An energy storage device comprising:
an electrode assembly in which electrodes are layered;
a case which accommodates the electrode assembly;
an insulating member having a sheet-like shape and disposed between the electrode assembly and the case,
wherein the insulating member includes:
   a first portion corresponding to a first surface of the electrode assembly in a first direction which is a direction of a short side surface of the case and a thickness direction of the electrode assembly;
   a second portion corresponding to a first end surface which is an end surface of the electrode assembly in a second direction orthogonal to the first direction;
   a third portion corresponding to a second surface of the electrode assembly in the first direction; and
   a first extending portion extending from the first portion,
the first extending portion includes a portion adjacent to the first portion and a distal end portion away from the first portion,
in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion,
in a state where the insulating member follows a surface of the electrode assembly, the first portion, the second portion, and the third portion of the insulating member follow corresponding surfaces of the electrode assembly, the first extending portion is wound around the electrode assembly such that a second end surface which is an end surface of the electrode assembly in a third direction orthogonal to each of the first direction and the second direction and the portion of the first extending portion which is adjacent to the first portion face each other, and the second surface and the distal end portion of the first extending portion face each other sequentially, and the electrode assembly is fastened by the first extending portion,
in the insertion of the electrode assembly into the case, in a state where the insulating member is caused to follow the surface of the electrode assembly, a boundary between the first portion and the first extending portion is located at a position corresponding to a boundary position between the first surface and the second end surface of the electrode assembly in the third direction, and
among corners of the first extending portion wound around the electrode assembly in the first direction, only a corner constituted by the first portion and the first extending portion is bent into a fold toward the second surface of the electrode assembly with respect to the first portion such that the first extending portion faces the second end surface, and at least a cart of a remaining portion of the first extending portion is curved so that the first extending portion follows the electrode assembly.

5. An energy storage device comprising:
an electrode assembly in which electrodes are layered;
a case which accommodates the electrode assembly; and
an insulating member having a sheet-like shape and disposed between the electrode assembly and the case,
wherein the insulating member includes:
   a first portion corresponding to a first surface of the electrode assembly in a first direction which is a direction of a short side surface of the case and a thickness direction of the electrode assembly;
   a second portion corresponding to a first end surface which is an end surface of the electrode assembly in a second direction orthogonal to the first direction;
   a third portion corresponding to a second surface of the electrode assembly in the first direction; and
   a first extending portion extending from the first portion,
the first extending portion includes a portion adjacent to the first portion and a distal end portion away from the first portion,
in a state where the insulating member is spread in a planar shape, the first portion, the second portion, and the third portion are continuously arranged in this order, and the first extending portion extends from an end portion of the first portion in a direction orthogonal to an arrangement direction of the first portion, the second portion, and the third portion,
the first extending portion of the insulating member is wound around the electrode assembly so as to have a radius of curvature larger than a radius of curvature of a corner portion of the case in a cross-sectional view of the energy storage device as viewed in the second direction, and
among corners of the first extending portion wound around the electrode assembly in the first direction, only a corner constituted by the first portion and the first extending portion is bent into a fold toward the second surface of the electrode assembly with respect to the first portion such that the first extending portion faces the second end surface.

6. The energy storage device according to claim 5, wherein the first extending portion of the insulating member is wound around the electrode assembly such that a gap is formed between the corner portion of the case and the first extending portion in a cross-sectional view of the energy storage device as viewed from the second direction.

7. The energy storage device according to claim 5, wherein
the distal end portion of the first extending portion is wound around the electrode assembly so as to face the third portion,
the insulating member includes a folded portion extending from the third portion, and
the first extending portion, the folded portion, and a second end surface which is an end surface of the electrode assembly in the third direction are arranged in this order in the third direction.

8. The energy storage device according to claim 5, wherein, in a state where the insulating member follows the surface of the electrode assembly, the first portion, the second portion, and the third portion of the insulating member follow corresponding surfaces of the electrode assembly, the first extending portion is wound around the electrode assembly such that a second end surface which is an end surface of the electrode assembly in the third direction and a portion of the first extending portion which is adjacent to the first portion face each other, and the second surface and the distal end portion of the first extending portion face each other, and the first extending portion is curved along the second end surface.

9. The energy storage device according to claim 5, further comprising a current collector disposed on a second end surface which is an end surface of the electrode assembly in the third direction, wherein the case, the first extending portion, and the current collector are arranged in this order, and the first extending portion of the insulating member is wound while facing the second end surface which is the end surface of the electrode assembly.

10. The energy storage device according to claim 5, wherein, in a state where the insulating member follows the surface of the electrode assembly, the first portion, the second portion, and the third portion of the insulating member follow corresponding surfaces of the electrode assembly, the first extending portion is wound around the electrode assembly such that a second end surface which is an end surface of the electrode assembly in the third direction and a portion of the first extending portion which is adjacent to the first portion face each other, and the second surface and the distal end portion of the first extending portion face each other, the first extending portion is curved along the second end surface, and the distal end portion is pulled toward a center of the second surface of the electrode assembly and fastened.

11. The energy storage device according to claim 5, wherein the electrode assembly is a substantially rectangular parallelepiped, the electrode assembly includes:

the first surface;

the first end surface that is a bottom surface in the second direction;

the second surface facing the first surface in the first direction;

the second end surface;

a third end surface which is an end surface of the electrode assembly opposite to the second end surface in the third direction; and a fourth end surface which is an upper surface in the second direction and is an end surface opposite to the first end surface, and the insulating member includes:

the first portion corresponding to the first surface;

the second portion corresponding to the first end surface;

the third portion corresponding to the second surface;

the first extending portion corresponding to the second end surface; and a second extending portion which corresponds to the third end surface and extends from an end portion of the first portion opposite to the end portion from which the first extending portion extends.

* * * * *